United States Patent
Lemieux et al.

[15] 3,688,606
[45] Sept. 5, 1972

[54] THROTTLE VALVE ACTUATOR FOR AN AUTOMATIC VEHICLE TRANSMISSION HAVING ENGINE BACK PRESSURE COMPENSATION

[72] Inventors: George E. Lemieux, Livonia; Stepas Smalinskas, Southfield, both of Mich.

[73] Assignee: Ford Motor Company, Dearborn, Mich.

[22] Filed: April 28, 1971

[21] Appl. No.: 138,025

[52] U.S. Cl. .......................................74/863, 74/844
[51] Int. Cl. ...........................B60k 23/00, F16h 5/52
[58] Field of Search.........................74/863, 864, 844

[56] References Cited
UNITED STATES PATENTS

| | | |
|---|---|---|
| 2,837,932 | 6/1958 | Roller.........................74/863 |
| 3,001,415 | 9/1961 | Smirl.........................74/864 X |
| 3,020,776 | 2/1962 | May et al..................74/863 X |
| 3,106,104 | 10/1963 | Harry...........................74/844 |
| 3,295,388 | 1/1967 | Groves.........................74/844 |
| 3,377,922 | 4/1968 | Spender et al...........74/863 X |

*Primary Examiner*—Carlton R. Croyle
*Assistant Examiner*—Thomas C. Perry
*Attorney*—John R. Faulkner and Donald J. Harrington

[57] ABSTRACT

A throttle valve actuator for a transmission throttle valve adapted to produce a pressure signal that is proportional in magnitude to the torque delivered by a transmission system in an automotive vehicle driveline wherein provision is made for modifying the output pressure signal in the throttle valve assembly to compensate for back pressure in the exhaust manifold system of the internal combustion engine.

6 Claims, 4 Drawing Figures

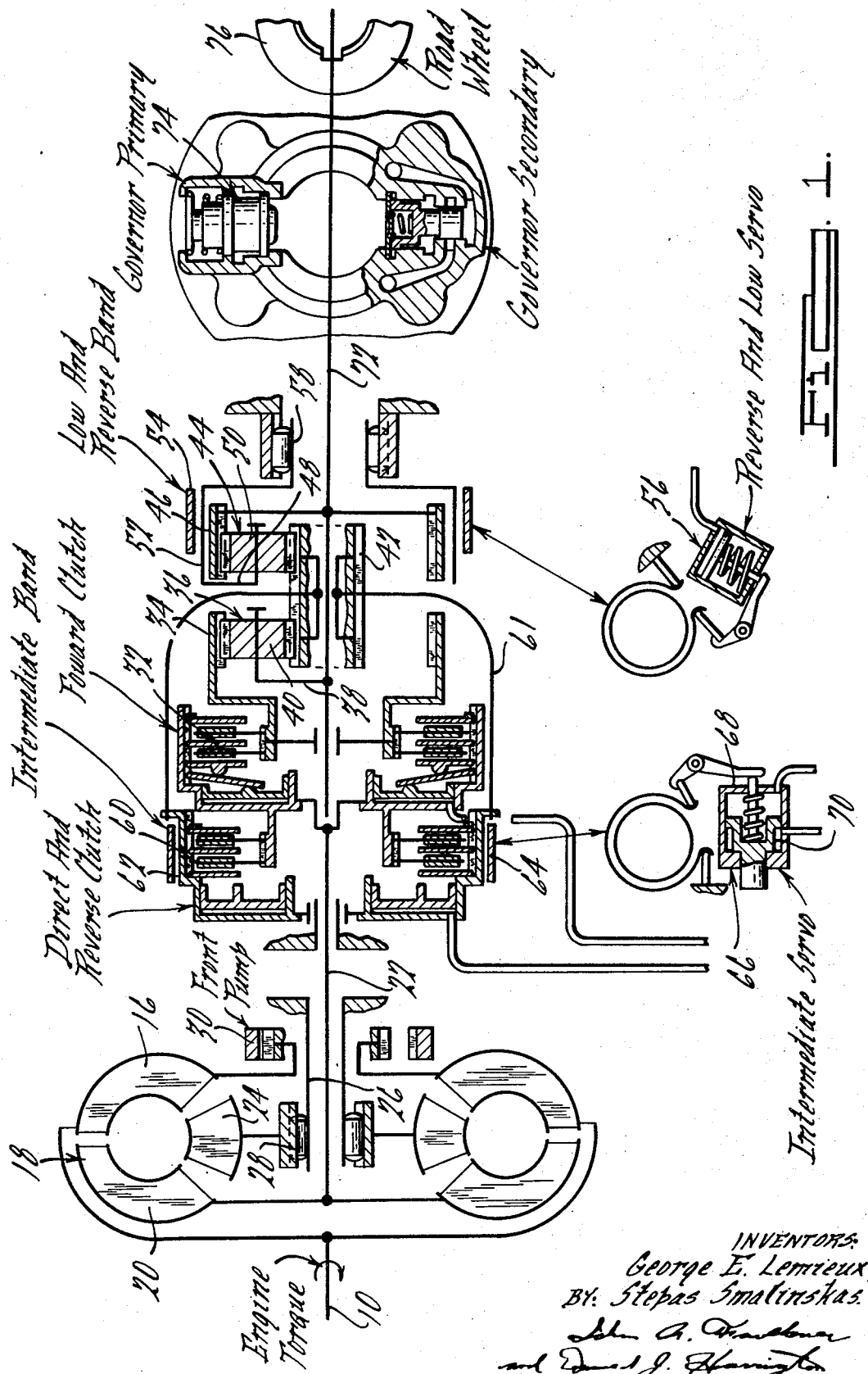

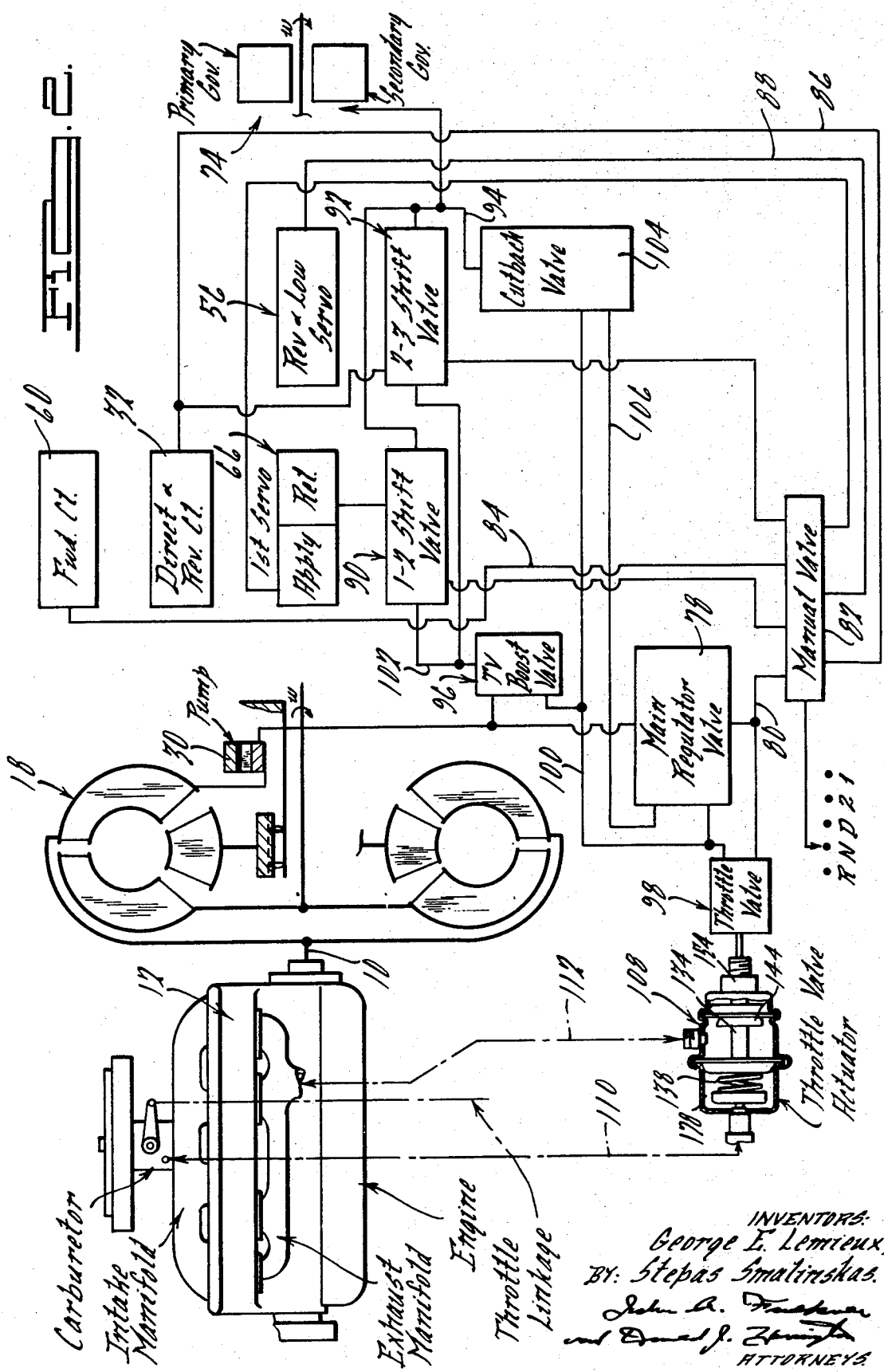

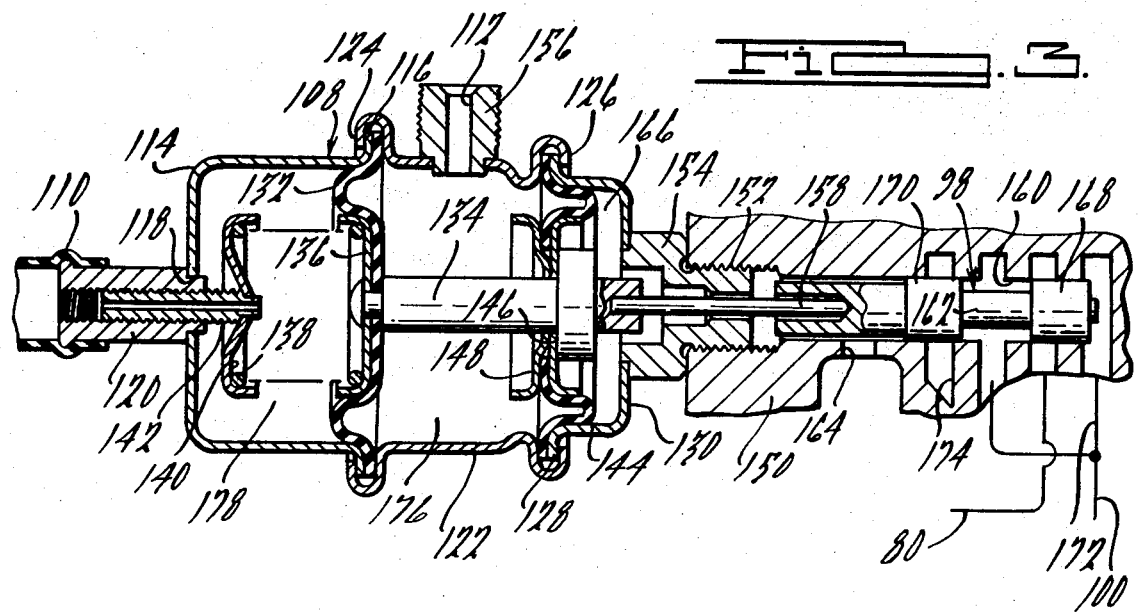
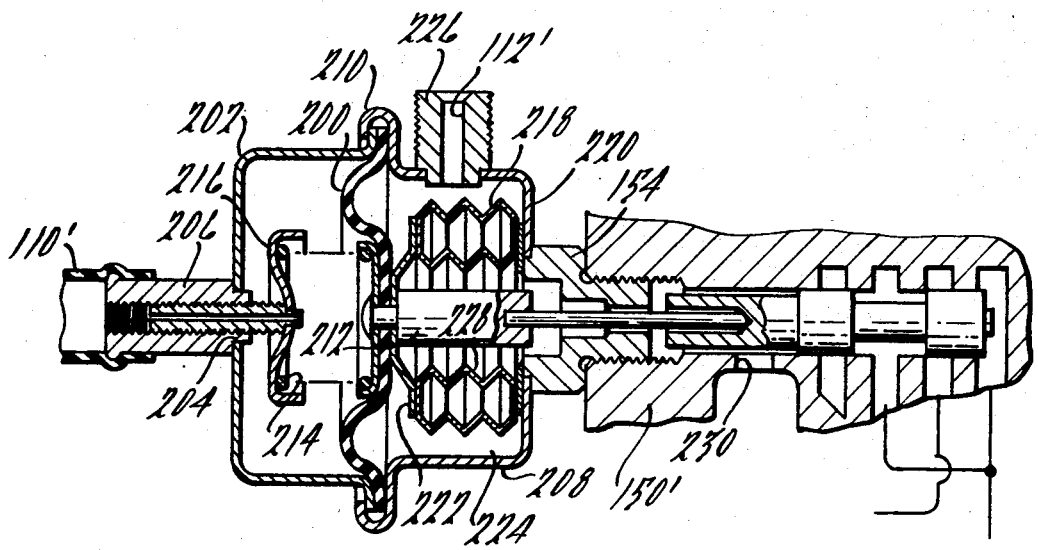

3,688,606

THROTTLE VALVE ACTUATOR FOR AN AUTOMATIC VEHICLE TRANSMISSION HAVING ENGINE BACK PRESSURE COMPENSATION

GENERAL DESCRIPTION OF THE INVENTION

Our invention relates to improvements in a valve circuit for an automotive power transmission mechanism adapted for use in an automotive vehicle driveline having an internal combustion engine. A transmission mechanism adapted to incorporate the improvement of our invention would include a hydrokinetic torque converter having an impeller connected to the crankshaft of an internal combustion engine. The turbine of the torque converter acts as a torque input member for a geared transmission system. Clutch-and-brake means are provided in the gear system for controlling the relative motion of elements of the gear system thereby effecting speed ratio changes.

A fluid pressure pump, which usually is driven by the engine, develops a circuit pressure for an automatic control valve circuit which in turn controls distribution of actuating pressure to fluid pressure operated servos for the clutch-and-brake means. The valve circuit responds to fluid pressure signals, including an engine torque signal and a vehicle speed signal, thereby initiating control functions which cause ratio changes in response to changes in the engine torque demand and in road speed.

The engine intake manifold pressure is used in such systems for actuating a throttle valve in the transmission valve circuit. The throttle valve produces in turn a pressure signal that is proportional in magnitude to manifold pressure. In certain driveline installations the accessories used with the vehicle engine cause a back pressure to be developed on the exhaust side of the engine exhaust manifold. Such accessories might be exhausted emission control devices such as catalytic converters and secondary air ports for reducing oxides of nitrogen, carbon monoxide, unburned hydrocarbons and other air impurities. If the ambient pressure at the exhaust manifold is approximately atmospheric pressure, the engine intake manifold pressure will provide a throttle pressure that is an approximate indicator of engine torque for any given road condition. If a substantial back pressure should develop at the downstream side of the exhaust manifold, however, the engine intake manifold pressure will not be able to be used to provide an accurate torque signal. It is necessary, therefore to compensate for the development of back pressure. An output signal developed by the throttle valve system then is an indicator of the difference between the manifold pressure and the back pressure, which is a more accurate indicator of torque in comparison to the signal that would be developed if the intake manifold pressure were to provide the sole influence on the throttle valve system.

In one embodiment of our invention pressure compensation is obtained by providing a pair of flexible diaphragms in an actuator housing, each diaphragm being connected to a movable throttle valve spool. The two diaphragms cooperate with the servo housing to define independent pressure chambers, one of which communicates directly with the engine manifold and the other which communicates directly with the engine exhaust system. The net force acting on the valve element is equal to the pressure force developed by the difference in the pressures of the two chambers.

If an attempt were made to use the conventional engine intake manifold throttle valve actuator that does not have engine back pressure compensation, the ratio shifts that occur would be late. That is, during the acceleration period, upshifts from a lower ratio to a higher ratio would occur at a speed that is higher than the calibrated shift speed. Since shifts at the higher speed would be accompanied by a depressed accelerator and an increased manifold pressure, the circuit pressure made available to the pressure operated servos would be higher than that pressure that would be required for optimum shift quantity. That is, the shift would occur with harshness due to the presence of excessive pressure in the servos.

In a second embodiment of our invention, we have introduced a means for compensating for changes in atmospheric pressure in addition to changes in back pressure on the engine.

BRIEF DESCRIPTION OF THE FIGURES OF THE DRAWING

FIG. 1 shows in schematic form an assembly view of a transmission gear system adapted to be controlled by a valve circuit having our improved throttle valve actuator;

FIG. 2 is a schematic representation in block diagram form of a valve circuit embodying our improved throttle valve actuator;

FIG. 3 is a longitudinal cross-sectional view of the throttle valve actuator used in the circuit of FIG. 2;

FIG. 4 is a view similar to FIG. 3, although it shows a second embodiment of the invention which is capable of compensating for altitude changes.

PARTICULAR DESCRIPTION OF THE INVENTION

Numeral 10 indicates one end of the crankshaft of an internal combustion engine. The engine is shown in FIG. 2 at 12. Shaft 10 is connected to impeller 16 of the hydrokinetic torque converter 18. Turbine 20 is situated in toroidal fluid flow relationship with respect to the impeller 16. It is connected drivably to turbine shaft 22. Bladed stator 24 is situated between the fluid flow outlet region of turbine 20 and the fluid flow inlet region of the impeller 16. It is journalled for rotation on stationary stator sleeve shaft 26 and it is anchored against rotation in a direction opposite to the direction of rotation of the engine by overrunning brake 28. Freewheeling motion of the stator 24 in the opposite direction is permitted.

Positive displacement pump 30 is connected drivably to impeller 16. Pump 30 serves as a pressure source for the control circuit to be described with reference to FIG. 2.

Turbine shaft 22 is connected to the torque input side of a forward clutch 32. This establishes selectively a frictional driving connection between the shaft 22 and ring gear 34 for a first simple planetary gear unit 36.

Gear unit 36 includes, in addition to ring gear 34, a carrier 38, planet pinions 40 journalled on the carrier 38 and sun gear 42. Sun gear 42 is common to a second simple planetary gear unit 44 which includes, in addition to the sun gear, ring gear 46, carrier 48 and planet pinions 50 journalled on the carrier 48 in meshing engagement with the ring gear and the sun gear. Carrier 48 is connected directly to the reaction brake drum 52 about which is positioned a friction brake band 54. Brake band 54 is adapted to be applied and released by a fluid pressure operated reverse-and-low servo 56, thereby providing a torque reaction during operation in manual-low and reverse drive operation.

Overrunning brake 58 is interposed between the drum 52 and the housing for the transmission mechanism. Brake 58 provides a torque reaction point during acceleration from a standing start in the lowest speed ratio.

Shaft 22 is connected also to the torque input side of a direct-and-reverse clutch 60. The output side of the clutch 60 is connected to sun gear 42 through a drive shell 61 which encircles the clutch 32 and the gear unit 36. The output side of the clutch 60 defines also brake drum 62 about which is positioned intermediate speed ratio brake band 64. This band may be applied and released by fluid pressure operated intermediate servo 66. Servo 66 includes the cylinder 68 and a double-acting piston 70 disposed in the cylinder 68 to define a pair of opposing pressure chambers. When both chambers are pressurized or exhausted, the servo is released. When the chamber on the right-hand side of the piston 70 is exhausted and the chamber on the left-hand side of the piston is pressurized, the servo actuates the brake band causing brake application.

Ring gear 46 and carrier 38 are connected drivably to power output shaft 72. A governor valve assembly comprising a primary governor and a secondary governor is connected drivably to the shaft 72 so that is may develop a speed signal that is proportional in magnitude to the speed of rotation of shaft 72. The governor assembly is indicated by reference character 74. Shaft 72 in turn is connected to the road wheels 76 through a suitable driveshaft and differential-and-axle assembly.

The transmission mechanism of FIG. 1 is capable of establishing three forward-driving speed ratios and a single reverse speed ratio. The lowest forward driving speed ratio is obtained by engaging forward clutch 32, which remains applied during operation in each of the two other forward driving speed ratios. Turbine torque during operation of the lowest speed ratio is distributed through the clutch 32 to the ring gear 34. Since the carrier 38 is connected to the output shaft 72, which resists rotation, reaction torque on the sun gear 42 will be distributed through the second gear unit 44 as the carrier 48 acts as a reaction member. Carrier 48 is held against rotation by the overrunning brake 58. The reaction torque in the gear unit 44 causes forward driving rotation of the ring gear 46 and the output shaft 72. Thus a split torque delivery path is established through the gearing.

If continuous operation in the lowest speed ratio is desired, or if coast braking operation in the lowest ratio is desired, brake band 54 is applied. Brake bank 54 complements the braking action of the overrunning brake 58 during forward driving in the lowest ratio.

A ratio change to the intermediate speed range is accomplished by releasing brake band 54 and applying intermediate speed ration band 64. Sun gear 42 then becomes anchored so that it may serve as a reaction element. Forward clutch 32 continues to deliver turbine torque to the ring gear 34. With the sun gear 42 acting as a reaction element, carrier 38 and the output shaft 72 are driven at an increased speed ratio. Gear unit 44 becomes inactive and overrunning brake 58 free-wheels.

Forward drive operation in the high speed direct drive ratio is accomplished by releasing both brakes and applying simultaneously both clutches. This causes the elements of the gear system to be locked together for rotation in unison with a 1:1 speed ratio.

Reverse drive operation is obtained by releasing the forward drive clutch 32 and applying direct and reverse clutch 60. At the same time friction brake band 54 is applied. Turbine torque now becomes delivered directly to the sun gear 42 through clutch 60 and through the drive shell 61. With the carrier 48 anchored by the brake band 54, ring gear 46 is driven in a reverse direction.

In FIG. 2 we have shown in block diagram form a control circuit for controlling the actuation and release of the clutches and brakes shown in FIG. 1. The circuit includes the engine driven pump 30 which applies circuit pressure to the main regulator valve 78 which in turn maintains a regulated pressure level in supply passage 80 extending to the manual valve 82. The manual valve may be adjusted to any of the positions indicated in FIG. 2 and identified by reference symbol R, N, D,2 and 1 which, respectively, refer to reverse, neutral, automatic drive, second speed ratio drive and first speed ratio drive.

During forward drive operation in any of the ratio ranges D2 or 1, pressure is supplied to the manual valve and through passage 84 to the forward clutch 60.

Direct reverse drive operation pressure distribution through the manual valve to the passage 84 is interrupted and pressure is distributed instead to passage 86. The manual valve also distributes pressure to passage 88 during reverse drive operation as well as during low speed ratio operation thereby allowing pressure distribution to reverse-and-low servo 56.

Selective pressure distribution to the direct-and-reverse clutch 32 and the intermediate servo 66 is provided by the 1–2 shift valve assembly 90 and the 2–3 shift valve assembly 92. The shift valves respond to governor pressure distributed to one side thereof through governor pressure passage 94 which communicates with the governor valve assembly 74. The shift valve responds also to the output pressure of a throttle pressure boost valve 96. Valve 96 receives circuit pressure from the main regulator valve and modifies it in accordance with the signal received from the output side of throttle valve 98, the latter communicating with the valve 96 through passage 100. The pressure signal in passage 102 on the output side of valve 96 is generally proportional in magnitude to the engine torque.

The throttle valve signal in passage 100 is distributed also to cut-back valve 104. When the cut-back valve assumes one operating mode, pressure is distributed through it from passage 102 to passage 106 which extends to the main regulator valve 78. When passage 106 is pressurized, the main regulator valve functions to regulate pressure at a higher pressure level than the pressure level that exists with passage 106 exhausted. The cut-back valve 104 responds to governor pressure which is distributed to it from the governor pressure passage 94.

At low operating speed during acceleration from a standing start, the cut-back valve distributes pressure to passage 106 thereby causing an increase in the line pressure. Upon an increase in vehicle speed the cut-back valve moves to exhaust passage 106. At that time the converter is operating in a higher speed ratio and the delivered torque is of a reduced magnitude.

The actuator for the throttle valve 98 is identified generally by reference character 108. It is connected to the engine intake manifold through a passage schematically indicated by reference character 110. It is connected to the exhaust manifold for the engine through a separate passage schematically indicated by reference character 112.

FIG. 3 shows in enlarged form a throttle valve and a throttle valve actuator. The actuator 108 of FIG. 3 comprises a first housing part 114. It is formed with an annular flange 116 at its open end. Its closed end is apertured at 118 to receive a fitting 120 for accommodating a connection with engine intake manifold passage 110.

An intermediate housing part 122 is formed with margin 124 which overlies the annular shoulder 116. Part 122 is formed also with a margin 126 at its opposite end which overlies annular flange 128 formed on a third housing 130. A first flexible diaphragm 132 is secured at its outer margin between the flange 116 and the adjacent margin 124 of the housing part 122. The central region of the diaphragm 132 is secured to a valve operating stem 134. A back-up plate 136 carried by the stem 134 engages one side of the diaphragm 132 and supports spring 138. The opposite end of the spring 138 is seated on a spring seat 140 carried by adjustment screw 142. The fitting 120 is internally threaded to accommodate the screw 142 so that the position of the spring seat 140 may be adjusted.

A second flexible diaphragm 144 is secured at its outer margin between the shoulder 128 and the margin 126. A central region of the diaphragm is secured between shoulder 146 on the stem 134 and retainer disc 148.

Transmission case 150 is formed with an internally threaded opening 152 which receives a threaded fitting 154. The housing part 130 is carried by the fitting 154. The chamber defined by the housing part 122 and the coupled diaphragms 144 and 132 are in fluid communication with the passage 112 which is defined in part by fluid fitting 156. A valve stem extension 158 is received within one end of throttle valve chamber 160 and engages throttle valve spool 162. The right-hand end of the chamber 160 is exhausted through exhaust port 164. This port also maintains chamber 166 at atmospheric pressure.

Valve spool 162 is formed with spaced valve lands 168 and 170. Line pressure passage 80 communicates with the valve chamber at a location adjacent land 168. Throttle pressure passage 100 communicates with the valve chamber 160 at a location intermediate lands 168 and 170. Feedback pressure passage 172 distributes throttle pressure to the left-hand side of the land 168. Exhaust passage 174 communicates with the chamber 160 directly adjacent land 170.

The effective area of diaphragm 144 is less than the effective area of diaphragm 132. Thus when chamber 176 between diaphragm 144 and the diaphragm 132 is subjected to engine back pressure in the exhaust manifold system, the stem 134 is urged in a left-hand direction. This opposes the force of spring 138 acting on the stem 134 in a right-hand direction.

Chamber 178, which communicates with the engine intake manifold, is less than atmospheric pressure. If the engine throttle is relaxed, the engine vacuum is increased so that the atmospheric pressure force acting on the right hand side of the diaphragm 144 urges the stem 134 in a left-hand direction.

An increase in the magnitude of manifold pressure for any given back pressure in an atmospheric pressure will result in an increase in the valve actuating force, thereby resulting in an increased throttle pressure in passage 100. The decrease in the engine intake manifold pressure will result in a corresponding decrease in throttle pressure in passage 100. In order to correlate the magnitude of the pressure in passage 100 with actual engine torque, chamber 176 communicates with the exhaust manifold through passage 112 as previously indicated. Any change in back pressure which would affect the actual engine torque for any given engine throttle setting then will result in appropriately compensated pressure in passage 100. Thus the shift point pressure in passage 102 which is distributed to the two shift valves will be at their proper calibrated value and will not be dependent solely upon engine throttle position.

In FIG. 4 there is shown a modified form of our invention wherein compensation is made for altitude changes as well as for engine back pressure variations. This embodiment includes a single diaphragm 200 which covers the open end of a first housing part 202. The closed end of housing part 202 has an aperture 204 which receives a fitting 206 corresponding to the fitting 120 of FIG. 3 embodiment. Engine intake manifold pressure passage 110' is connected to the fitting 206.

A second housing part 208 has a margin 210 turned over the left-hand margin of the housing part 202. The outer periphery of the diaphragm 200 is secured between the adjacent margins of the parts 202 and 208. A fitting 154', which corresponds to the fitting 154 of FIG. 3, is carried by the housing part 208. This is received within the transmission case 150'.

The central region of the diaphragm 200 is secured to valve stem 212. Valve spring 214 acts on the left-hand side of the diaphragm 200 and is seated at its right-hand end on an adjustable valve seat 216. A collapsible bellows 218 is situated within the housing part 208 and is seated at its right-hand end on the end wall 220 of the housing 208. The left-hand end of the bellows 218 is supported by disc 222 which in turn is carried on stem 212. The interior of the bellows 218 is evacuated. The chamber 224 on the exterior of the bellows 218 is subjected to engine back pressure in the engine exhaust manifold. For this purpose a fluid fitting 226 is carried by the housing part 208 to permit a fluid connection with passage 112' extending to the engine exhaust manifold. The chamber 228 within the bellows 218 communicates with the atmosphere through vent port 230.

An increase in back pressure in chamber 224 will result in a decreased throttle pressure signal for any given engine intake manifold pressure. Since the throttle valve actuating forces are determined by the pressure differential across the diaphragm 200, any change in atmospheric pressure also will result in a change in the magnitude of the net pressure forces acting on the diaphragm 200.

Having thus described preferred forms of our invention, what we claim and desire to secure by U.S. Letters Patent is:

1. In a fluid pressure control circuit for an automatic power transmission mechanism in an automotive vehicle driveline having an internal combustion engine with a throttle valve control, an air-fuel mixture intake manifold and an exhaust gas manifold, a throttle valve system for developing a pressure signal that is proportional in magnitude to engine torque comprising a pressure modulator valve, means for supplying said pressure to said modulator valve with source pressure, a throttle valve actuator, said actuator comprising an actuator housing, a movable diaphragm cooperating with said housing to define an intake manifold pressure chamber, means for connecting said manifold pressure chamber to the engine intake manifold of said engine, a mechanical connection between said diaphragm and said modulator valve element whereby a pressure force is acting on said diaphragm and is distributed to said valve element to actuate the same, a secondary pressure chamber defined in part by said diaphragm and located on the side of said diaphragm opposite said intake manifold pressure chamber, and means for providing a pneumatic connection between said secondary chamber and the exhaust manifold of said engine whereby the pressure signal developed by said throttle valve element is proportional in magnitude to the difference in the pressures existing in said intake manifold and in said exhaust manifold.

2. The combination as set forth in claim 1 wherein said actuator comprises a secondary diaphragm, the outer margin of said secondary diaphragm is secured to said housing, the connection between said valve element and said first-named diaphragm including a valve operating stem, said stem being connected to the central region of each diaphragm, said diaphragms defining therebetween said secondary chamber, the effective pressure area of said second-named diaphragm being less than the effective pressure area of the first-named diaphragm whereby the net pressure forces acting on said diaphragms due to the presence of pressure in said secondary chamber opposes the pressure forces acting on said diaphragms due to the presence of pressure in said intake manifold pressure chamber.

3. The combination as set forth in claim 1 wherein said actuator includes spring means situated in said intake manifold pressure chamber and acting on its associated diaphragm to supplement the pressure force of the intake manifold pressure.

4. The combination as set forth in claim 2 wherein said actuator includes spring means situated in said intake manifold pressure chamber and acting on its associated diaphragm to supplement the pressure force of the intake manifold pressure.

5. The combination as set forth in claim 1 wherein said actuator comprises an evacuated bellows, one end of said bellows being secured to said housing, the other end of said bellows being connected to the side of said diaphragm opposite said intake manifold pressure chamber, said bellows cooperating with said housing to define said secondary pressure chamber, said secondary pressure chamber surrounding the evacuated bellows, the interior region of said bellows communicating with an atmospheric pressure region whereby an increase in atmospheric pressure results in an increased throttle pressure for any given engine intake manifold pressure and engine back pressure in said exhaust manifold.

6. The combination as set forth in claim 3 wherein said actuator comprises an evacuated bellows, one end of said bellows being secured to said housing, the other end of said bellows being connected to the side of said diaphragm opposite said intake manifold pressure chamber, said bellows cooperating with said housing to define said secondary pressure chamber, said secondary pressure chamber surrounding the evacuated bellows, the interior region of said bellows communicating with an atmospheric pressure region whereby an increase in atmospheric pressure results in an increased throttle pressure for any given engine intake manifold pressure and engine back pressure in said exhaust manifold.

* * * * *